Jan. 31, 1961  R. A. HIRSCH ET AL  2,969,685
CONTROL MECHANISM FOR VARIABLE PITCH PROPELLERS
Filed April 2, 1957  3 Sheets-Sheet 1
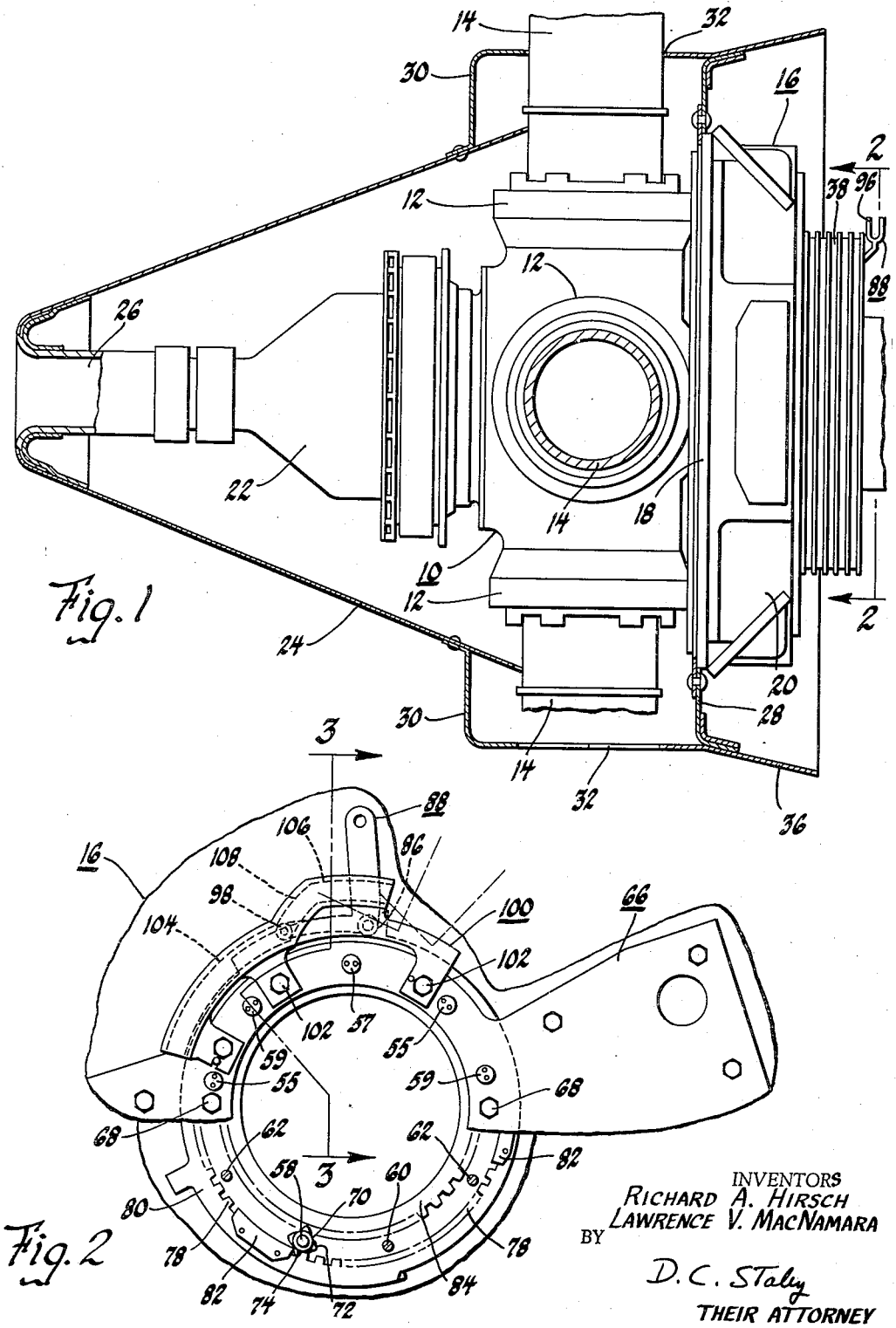
INVENTORS
RICHARD A. HIRSCH
LAWRENCE V. MACNAMARA
BY
D. C. Staley
THEIR ATTORNEY Jan. 31, 1961  R. A. HIRSCH ET AL  2,969,685
CONTROL MECHANISM FOR VARIABLE PITCH PROPELLERS
Filed April 2, 1957  3 Sheets-Sheet 2

INVENTORS
RICHAR A. HIRSCH
LAWRENCE V. MACNAMARA
BY
D. C. Staley
THEIR ATTORNEY

United States Patent Office 2,969,685
Patented Jan. 31, 1961

2,969,685

CONTROL MECHANISM FOR VARIABLE PITCH PROPELLERS

Richard A. Hirsch, West Milton, and Lawrence V. McNamara, New Carlisle, Ohio, assignors to General Motors Corporation, Detroit, Mich., a corporation of Delaware Filed Apr. 2, 1957, Ser. No. 650,262

2 Claims. (Cl. 74—89)

This invention pertains to variable pitch propellers, and particularly to an improved control mechanism for variable pitch propellers.

Heretofore, it has been proposed to manually schedule propeller blade angle in accordance with the position of the power levers in a multi-power plant aircraft including a plurality of turbine driven propellers, so as to maintain the drag created by a failing engine during takeoff at a minimum. A propeller assembly of this type is disclosed in application S.N. 572,348 filed March 19, 1956 in the name of Bodem et al., and assigned to the assignee of this invention, and corresponding British Patent 810,-454. In the propeller of the aforementioned copending application, a control lever is rigidly connected to a rotatable control member so that a predetermined angular movement of the control lever will effect a like movement of the control member which schedules blade angle. The control member is connected by a plurality of high lead screws to an axially movable control ring disposed within the rotatable propeller regulator, the control ring being movable between fixed limits. It has now been determined that it is desirable to begin scheduling a blade angle above the flight low pitch stop position at a lower position of the power lever during movement of the power lever from the flight idle position to the takeoff position. Since the control ring has its limits of movement fixed, means must be incorporated in the connection between the control lever and the control member for reducing the amount of movement of the control member during a portion of the movement of the control lever by the power lever. The present invention relates to drive means between the control lever and the control member which impart movement of the control member throughout an extended beta follow-up range of movement of the control lever. Accordingly, among our objects are the provision of a variable pitch propeller having a control lever and a control member including means for varying the amount of movement imparted to the control member during a portion of the movement of the control lever; the further provision of a variable pitch propeller including a control lever and a control member having an automatically variable ratio driving connection between the control lever and the control member, and the still further provision of a variable pitch propeller having a control lever and a control member for positioning a control element including an intermittent drive between the control member and the control element and an automatically variable ratio driving connection between the control lever and the control member.

The aforementioned and other objects are accomplished in the present invention by incorporating a cam assembly in the propeller which automatically varies the driving connection, or drive ratio, between the control lever and the control member during a portion of the movement of the control lever. Specifically, the control mechanism is designed for use with a propeller of the type including a regulator rotatable with the propeller about a stationary adapter assembly. The stationary adapter assembly carries a plurality of nonrotatable, axially movable control rings disposed within the regulator and having operative connections with control valves disposed within the regulator, the control rings being threadedly engaged with high lead screws rotatably supported by the stationary adapter assembly. The high lead screws have pinions attached thereto which engage ring gears whereby rotation of the ring gears will effect rotation of the high lead screws so as to impart axial movement of the control rings.

One of the control rings, namely, a condition control ring, is movable between predetermined limits within the regulator. The condition control ring or control element, is operatively connected to a cam follower roller which cooperates with a cam formed on a valve lever so as to displace the lever and the valve to schedule blade angle in a well known manner. The pinion gears, attached to the high lead screws which threadedly engage the condition ring, have an intermittent driving connection with an internal ring gear, or control member. The control mechanism includes a control lever, the control lever having arm portions located at substantially right angles to each other and a bight portion which is pivotally connected to the control member. One of the arms of the control lever is formed as a yoke for connection to conventional linkage actuated by the power lever. The other arm of the control lever has a cam follower attached thereto.

The propeller also includes a stationary accessory plate which is attached to the adapter assembly. The stationary accessory plate has a cam attached thereto with a pair of grooves of different radii concentric with the ring gear, or control member, and an eccentric groove connecting the concentric grooves. The cam follower is always maintained in engagement with the grooves in the cam, and when the cam follower engages either concentric groove, a one degree angular movement of the control lever about the accessory plate will effect a one degree angular movement of the control member. In other words, when the cam follower engages a concentric groove the drive ratio between the control lever and the control member is 1:1. However, when the cam follower engages the eccentric groove, the control lever moves angularly about its pivotal connection with the control member as well as about the accessory plate so that a one degree angular movement of the control lever will effect less than one degree angular movement of the control member. This arrangement enables the control member to impart movement to the condition ring throughout a greater portion of the total movement of the control lever and the power lever.

Further objects and advantages of the present invention will be apparent from the following description, reference being had to the accompanying drawings, wherein preferred embodiments of the present invention are clearly shown.

In the drawings:

Figure 1 is a view, partly in section and partly in elevation, of a variable pitch propeller constructed according to this invention with certain parts removed.

Figure 2 is a fragmentary sectional view taken along lines 2—2 of Figure 1, with certain parts broken away.

Figure 3:
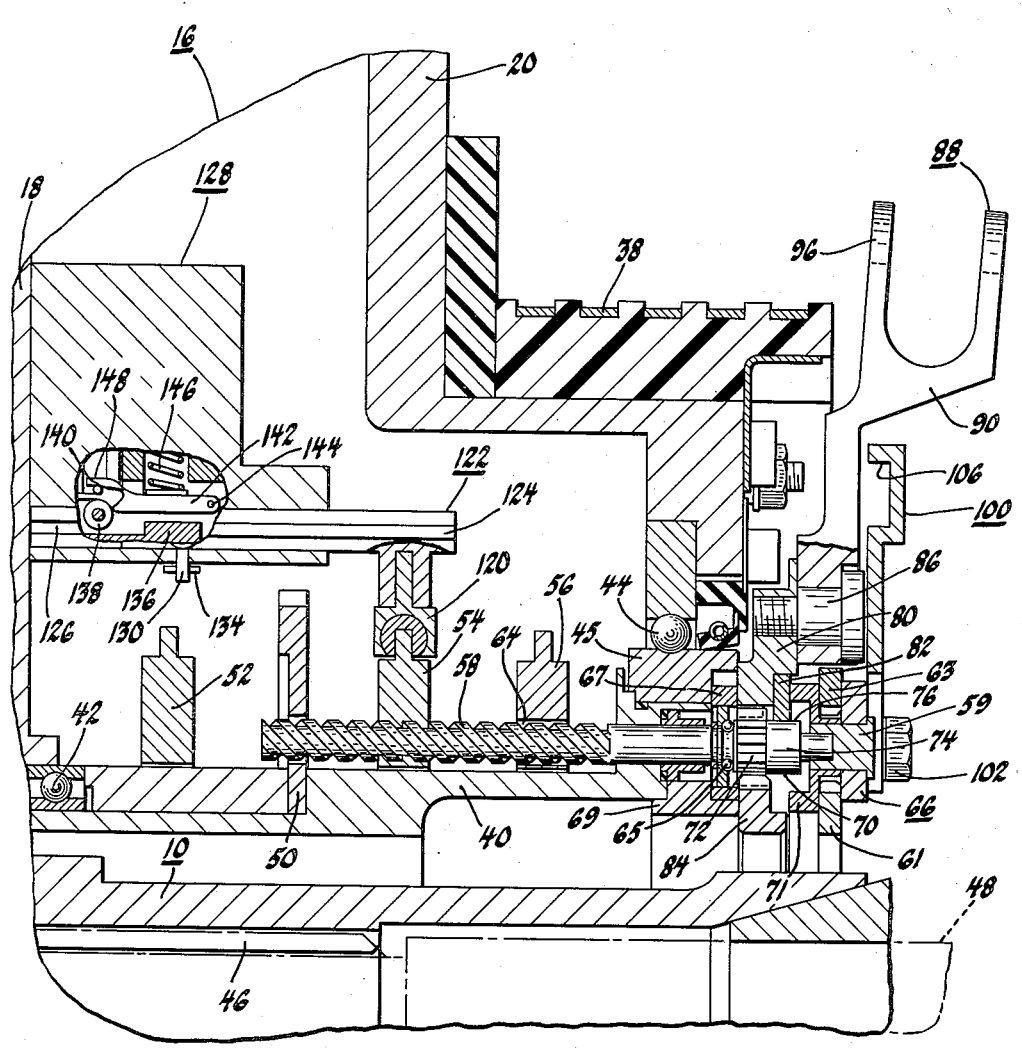
Figure 3 is an enlarged fragmentary sectional view taken along line 3—3 of Figure 2.

With particular reference to Figure 1, a propeller assembly is shown including a hub 10 having a plurality of radially arranged sockets 12 within which propeller blades 14 are journalled for rotation about their longitudinal axes throughout a range of pitch angles from a maximum reverse, or negative angle, to a feathered angle. The propeller hub 10 has a regulator 16 attached to the rear thereof, the regulator including a front plate 18 and a cover 20 connected to rotate with the hub 10. A reservoir assembly 22 is attached to the front propeller hub for rotation therewith. A spinner shell portion 24 having an air inlet tube 26 is piloted on the front end of the reservoir assembly 22. The spinner shell 24 includes islands 30 having openings 32 through which the blades 14 extend. A rear spinner portion 36 is supported by a bulkhead 28 secured to the regulator front plate 18, and is connected to the shell portion 24 by any suitable fasteners, not shown, well known in the art.

With particular reference to Figures 2 and 3, the regulator cover 20 carries a slip ring assembly 38. In addition, the regulator assembly 16 includes a stationary sleeve 40 constituting a part of the adapter assembly and, about which the regulator housing, including the front plate 18 and the cover 20, is journalled for rotation by ball bearing assemblies 42 and 44. The hub 10 is connected by spline teeth 46 to a turbine driven shaft 48, shown in phantom. The stationary adapter sleeve 40 has attached thereto a stationary power gear 50 and has slidably mounted thereon three axially movable control rings 52, 54 and 56.

As in the aforementioned copending application, control ring 52 constitutes a feathering ring, control ring 54 a conditioning ring and control ring 56 a synchronizing ring. The condition ring 54 is threadedly engaged by three high lead screws 58 disposed 120° apart. The feathering ring 52 is also engaged by three high lead screws 60 likewise angularly spaced by 120° and supported by tubular members 55 in an accessory plate 66. The feathering ring screws have pinions attached thereto, not shown, which engage external ring gear 61. In a similar manner, the synchronizing ring 56 is engaged by three high lead screws 62, which are supported by tubular members 57 in the accessory plate 66. The synchronizing lead screws have pinions attached thereto, not shown, which engage internal ring gear 63. The high lead screws 58 which threadedly engage the condition ring 54 extend through openings 64 in the synchronizing ring 56, so that rotation of the high lead screws 58 will only impart movement to the condition ring 54. Similarly, the high lead screws which threadedly engage the feathering ring 52 pass through openings, not shown, in the condition ring 54, the synchronizing ring 56, and the pump power gear 50.

The high lead screws 58 are journalled by ball bearing assemblies 65, the outer race of which are carried by rings 67. The rings 67 are supported between the inner race 45 of bearing 44 and a stationary annulus 69, and a condition gear 80 and a ring gear 84. The ends of the high lead screws 58 are supported by tubular members 59 which threadedly engage the accessory plate 66 and cup-shaped members 71.

The accessory plate 66 is attached by bolts 68 to the adapter sleeve 40. In addition, the accessory plate is suitably connected to a stationary gear box housing, not shown, so as to prevent rotation of the accessory plate 66 and the adapter sleeve 40.

The high lead screws 58 have pinion assemblies 70 attached thereto. As seen particularly in Figure 3, the pinion assemblies 70 include a toothed portion 72 and an untoothed portion 74 having a flat 76 thereon. The toothed sections 72 of the pinion assemblies 70 are engageable with circumferentially spaced toothed portions 78 formed on the internal surface of the condition ring gear 80. The condition ring gear 80 has three circumferentially spaced toothed portions 78 with flanges 82 attached to the ring gear 80 between the toothed sections 78. The flanges 82 cooperate with the flats 76 on the pinion assemblies 70 to prevent rotation of the pinion assemblies 70 and the high lead screws 58 during a portion of the movement of the ring gear 80. The ring 80 can rotate when the flanges 82 engage the flats 76 on the pinion assemblies 70 since the ring gear 80 does not have any teeth engaging the toothed portions 72 of the pinion assemblies in these positions. Thus, the high lead screws 58 have an intermittent driving connection with the ring gear, or control member, 80. Movement of the three pinion assemblies 70 when the toothed portions 72 thereof engage the toothed portions 78 of the condition ring gear 80 is synchronized by the external ring gear 84 that meshes with the toothed portions 72 of the pinion assemblies 70.

Figure 4:
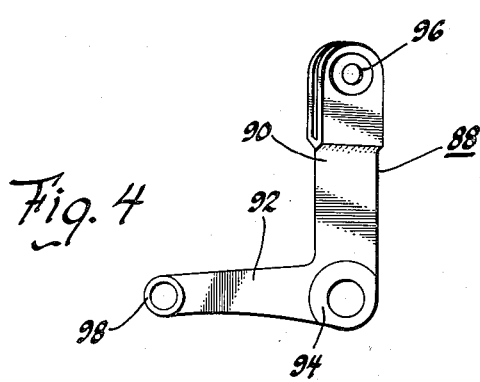
Figure 4 is a view in elevation of the control lever.

A control lever 88 is pivotally attached to the ring gear 80 by means of a screw 86. As shown particularly in Figure 4, the control lever 88 includes arms 90 and 92 located at substantially right angles to each other, the arms being connected by a bight portion 94 through which the pivot screw 86 extends. The arm 90 has its outer end formed as a yoke 96 whereby it may be connected by suitable linkage to a power lever, not shown. The arm 92 carries a roller 98 constituting a cam follower.

As seen in Figure 3, the stationary accessory plate 66 has attached thereto a cam 100 by bolts 102. The cam 100 is formed with grooves 104 and 106 which are concentric with the condition ring gear 80. The grooves 104 and 106 are interconnected by an eccentric groove 108. The follower 98 is situated so as to always engage one of the grooves in the cam 100. As seen in Figure 2, the follower 98 is located at the juncture between grooves 104 and 108.

When the follower 98 engages groove 104, the driving ratio between the control lever 88 and the condition gear 80 is 1:1. This is, for each degree of movement of the control lever 88 relative to the stationary accessory plate 66, the condition ring gear 80 will be moved throughout one degree. Similarly, when the follower 98 travels in the groove 106 of the cam 100 the drive ratio between the lever 88 and the condition ring gear 80 will be 1:1. However, when the follower 98 engages the groove 108, the control lever 88 will move about pivot pin 86 as well as about the accessory plate 66 thereby reducing the amount of movement imparted to the condition ring gear 80. For example, the eccentric groove 108 may be arranged so that the input to control lever 88 is twice as great as the angular movement imparted to the condition ring gear whereby the drive ratio between the lever 88 and the condition ring gear 80 is 2:1 when the cam follower 98 traverses the eccentric groove 108.

Figure 5:
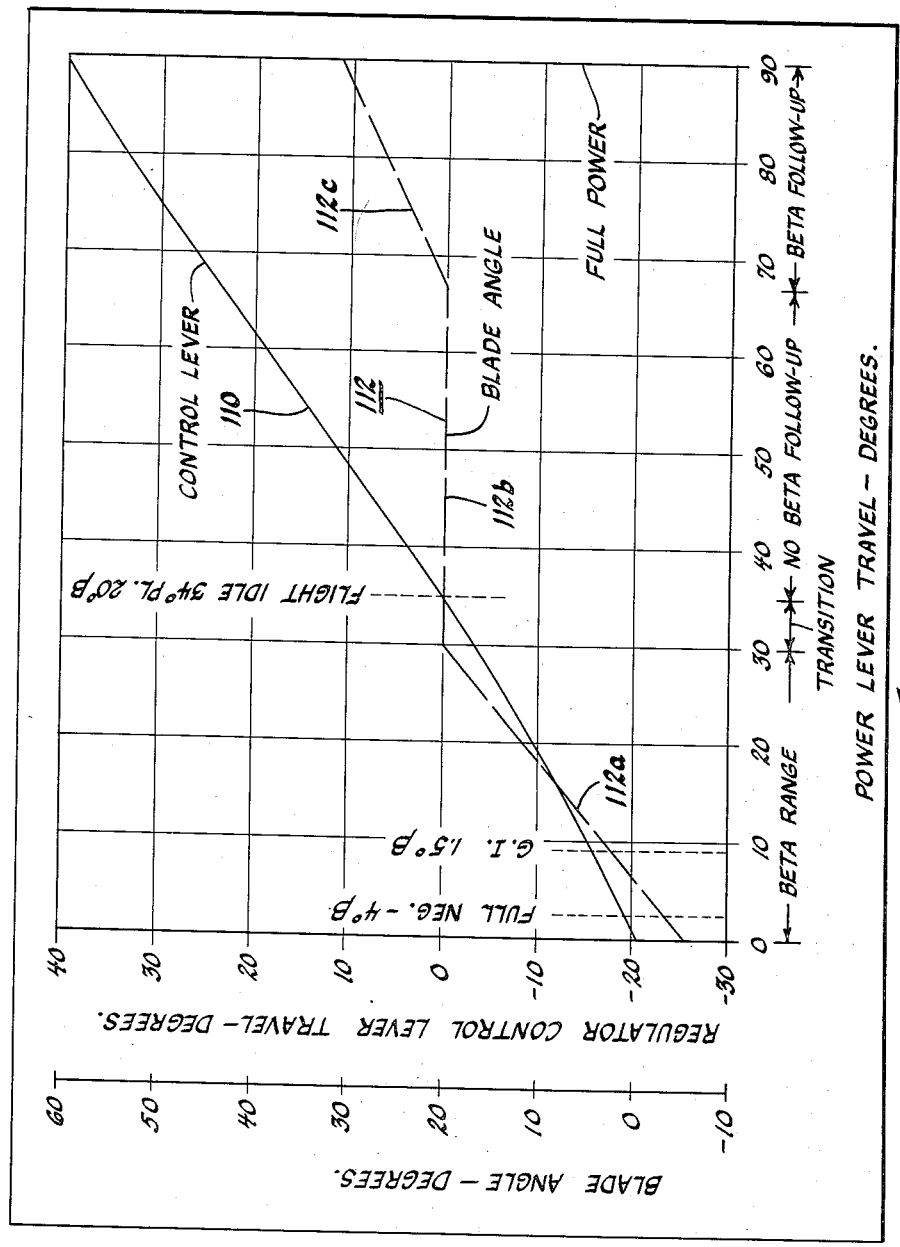
Figure 5 is a graph depicting the relationship between manually scheduled blade angles vs. power lever position as well as power lever position vs. control lever position.

With particular reference to the graph shown in Figure 5, curve 110 indicates that the control lever travel is substantially proportional to the power lever travel. Curve 112 depicts the scheduled blade angle vs. power lever position. The control lever 88 as shown in Figure 2 is at the beta follow-up position, or in other words is located at approximately a +24° position. Movement of the control lever 88 to the 0° position does not impart movement to the high lead screws 58 and the control ring 54, since in this range of movement of the ring gear 80, the flanges 82 engage the flats 76 and prevent rotation of the high lead screws 58. Between 0° and approximately −3° of control lever movement constitutes a transition range wherein the flanges 82 remain in engagement with the flats 76 on the pinion assemblies 70. However, between −3° control lever movement and a −21° of control lever movement, the high lead screws 58 are rotated and in this manner any angle in the beta range, between full reverse and a +20° can be selected.

This blade angle scheduling is shown by portions 112a of curve 112. The flat portion 112b of curve 112 indicates that no movement is imparted to the control ring 54 and the high lead screws 58 when the flats 76 on the pinion gear assemblies 70 engage the flanges 82 on the ring gear 80. However, during movement of the cam follower in the eccentric groove 108 the toothed portion 72 again engages the toothed section 78 of the control ring gear 80 so as to impart movement to the high lead screws 58 and the control ring 54. Thus, between 68° power lever movement and 90° power lever movement the minimum positive schedule blade angle is raised from 20° to 32°. As indicated by portion 112c of curve 112 the slope of portion 112c is less than the slope of portion 112a which result occurs by reason of the reduced drive ratio between the control lever and the condition ring gear 80 when the follower 98 engages the eccentric groove 108. Thus, the slope of portion 112c is substantially one-half the slope of portion 112a.

Referring again to Figure 3, the control ring 54 engages a shoe 120 attached to a slidable carriage 122 having tongue portions 124 received in grooves 126 of valve housing 128. The valve housing 128 is suitably attached to the regulator front plate 18. The carriage 122 has a pin 130 attached thereto which is received by a bifurcated end of a lever 134. Reference to the aforementioned copending application will disclose this arrangement in greater detail, or suffice it here to say that the lever 134 is attached to a slidable carriage 136 which carries a roller 138. The roller 138 is engageable with a cam portion 140 formed on a speed responsive lever 142 pivoted at 144 to the valve housing 128. The lever 142 is engaged by a spring 146 between its ends, and is articulated to a valve plunger 148. The other end of the lever 134, not shown, is connected with a well known feedback mechanism such as shown in the aforementioned copending application whereby movement of the roller 138 is employed to select, or schedule, a blade angle, which, when achieved by the propeller blades is actuated in a follow-up manner through the feedback mechanism and lever 134 to reposition the valve plunger 148 to a neutral position.

The control ring 54 is movable between predetermined limits within the regulator housing since movement of the condition gear 80 is limited by suitable means so that the follower 98 cannot be disengaged from the grooves in the cam 100. By incorporating the automatic reduction drive between the control lever and the condition ring gear, the beta follow-up portion of the movement of the power lever can be extended without changing the fixed limits of travel of the control ring 54 within the regulator housing. Moreover, the scheduled blade angles at the beginning and end of the beta follow-up movement can be maintained within the desired range so as to be compatible with the power output of the turbine.

While the form of embodiment of the invention as herein disclosed constitutes a preferred form, it is to be understood that other forms might be adopted, as may come within the scope of the claims which follow.

What is claimed is as follows:

1. In a variable pitch propeller, an axially movable control element, a rotatable control member, at least one high lead screw helically connected with said control element whereby rotation of said high lead screw will effect axial movement of said control element, means interconnecting said high lead screw and said rotatable control member for establishing intermittent driving connection therebetween, an angularly movable control lever, and means interconnecting said control lever and said control member and establishing an automatically variable ratio driving connection between the control lever and the control member during movement of said control lever between its limit positions.

2. In a variable pitch propeller, an axially movable control element, a plurality of high lead screws helically engaging said element, pinion assemblies attached to said high lead screws, a rotatable control member having a plurality of circumferentially spaced toothed surfaces and flanges interposed between said toothed surfaces, said flanges being axially spaced from said toothed surface, said pinion assemblies having axially spaced toothed portions and flat portions whereby said high lead screws have an intermittent driving connection with said rotatable control member, an angularly movable control lever, and means establishing an automatically variable ratio driving connection between said control lever and said control member between the limits of movement of said control lever.

References Cited in the file of this patent

UNITED STATES PATENTS

| 2,406,872 | Waite | Sept. 3, 1946 |
| 2,409,231 | Waite | Oct. 15, 1946 |
| 2,435,037 | Gardiner et al. | Jan. 27, 1948 |
| 2,626,670 | Moore | Jan. 27, 1953 |